United States Patent
Chamaillard et al.

(10) Patent No.: US 7,878,278 B2
(45) Date of Patent: Feb. 1, 2011

(54) HEAVY VEHICLE

(75) Inventors: Jean-Marc Chamaillard, Beaumont (FR); Pierre Durif, Enval (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/329,699

(22) Filed: Jan. 11, 2006

(65) Prior Publication Data

US 2006/0137917 A1    Jun. 29, 2006

Related U.S. Application Data

(63) Continuation of application No. PCT/EP2004/007660, filed on Jul. 12, 2004.

(30) Foreign Application Priority Data

Jul. 17, 2003    (FR)    ................................. 03 08755

(51) Int. Cl.
  *B62D 61/10*    (2006.01)
(52) U.S. Cl. .................. 180/24.03; 180/22; 180/24.06; 180/900; 152/376
(58) Field of Classification Search ................. 180/22, 180/24.06, 24.08, 900, 905, 24.01, 24.02, 180/24.09; 152/320, 376
See application file for complete search history.

(56) References Cited

U.S. PATENT DOCUMENTS

| | | | | |
|---|---|---|---|---|
| 3,328,088 A | * | 6/1967 | Olson ........................ 301/36.1 |
| 3,713,701 A | * | 1/1973 | Penner ....................... 301/39.1 |
| 3,890,010 A | * | 6/1975 | Dove et al. .................... 301/52 |
| 4,202,454 A | * | 5/1980 | Browne et al. ................. 213/86 |
| 4,359,116 A | * | 11/1982 | Mankey ..................... 180/6.48 |
| 4,818,031 A | * | 4/1989 | Brown ........................ 301/36.1 |
| 5,139,103 A | * | 8/1992 | Ducote ...................... 180/24.01 |
| 5,289,905 A | * | 3/1994 | Braschler .................... 188/296 |
| 6,021,719 A | * | 2/2000 | Kershaw, Jr. ................ 105/72.2 |
| 6,105,707 A | * | 8/2000 | Tamura et al. ............... 180/307 |
| 6,217,125 B1 | * | 4/2001 | Tubetto ...................... 301/40.3 |
| 6,672,985 B2 | * | 1/2004 | Chung et al. ................. 475/221 |
| 6,763,906 B1 | * | 7/2004 | Momiyama et al. ......... 180/410 |
| 2002/0046794 A1 | | 4/2002 | Duriff | |

FOREIGN PATENT DOCUMENTS

CH    564 435 A    7/1975

(Continued)

OTHER PUBLICATIONS

Liebherr Minning Equipment Co. (Press release Oct. 16, 1998, Liebherr T282 Design and Development).*

*Primary Examiner*—Toan C To
(74) *Attorney, Agent, or Firm*—Cohen Pontani Lieberman & Pavane LLP

(57) ABSTRACT

Presented is a heavy vehicle, such as a transport vehicle or civil engineering vehicle, of a mass greater than 500 metric tons and operable to generate a motive power. The vehicle includes tires of radial structure having a diameter greater than 3.5 meters, a front axle coupled to at least two tires, and at least one rear axle coupled to at least two tires and by which is transmitted at least part of the motive power. At least one of the axles includes at least four tires associated in pairs symmetrically on either side of the axle, and two associated tires have different axial widths.

6 Claims, 2 Drawing Sheets

FOREIGN PATENT DOCUMENTS

| | | |
|---|---|---|
| CH | 564435 | 7/1975 |
| DE | 3406914 A1 * | 8/1984 |
| FR | 1 330 920 A | 12/1963 |
| FR | 2 541 647 A | 8/1984 |
| FR | 2 684 336 | 6/1993 |
| FR | 2 684 336 A | 6/1993 |
| WO | WO 00/71365 A | 11/2000 |
| WO | WO 00/71365 A1 | 11/2000 |

* cited by examiner

HEAVY VEHICLE

CROSS REFERENCE TO RELATED APPLICATIONS

This application is a U.S. Continuation Application of International Application PCT/EP2004/007660 filed Jul. 12, 2004.

BACKGROUND OF THE INVENTION

1. Field of the Invention

The invention relates to a heavy vehicle such as a transport vehicle or a "civil engineering" vehicle, of a mass greater than 500 metric tons and fitted with tires of a diameter greater than three meters fifty.

2. Description of Prior Art

Such vehicles, generally designed for carrying heavy loads, comprise a front steering axle comprising two steering wheels and a rear axle, which is most frequently rigid, comprising four driving wheels distributed in pairs on each side.

An axle is defined as an assembly of the elements enabling the fixed structure of the vehicle to be connected to the ground.

The axial or transverse direction of the tire is parallel to the axis of rotation of the tyre.

The circumferential direction of the tire, or longitudinal direction, is the direction corresponding to the periphery of the tire and defined by the rolling direction of the tire.

The axis of rotation of the tire is the axis around which it turns in normal use.

In the case of vehicles, in particular intended for use in mines or quarries for transporting loads, the problems of access and demands of production lead the manufacturers of these vehicles to increase their loading capacity. It follows that the vehicles become ever larger and thus ever heavier in themselves and are capable of transporting an ever greater load. The current masses of these vehicles may reach several hundred metric tons, the same being true of the load to be transported; the total mass may reach 600 metric tons.

Since the loading capacity of the vehicle is directly linked to that of the tires, it is known that, to increase this loading capacity, it is necessary to increase the amount of air contained in the tires.

At present, as stated above, vehicles of this type, such as dumpers used in mines, comprise a rear axle on which are mounted four wheels, arranged in pairs, to respond to these demands.

Furthermore, the dimensions of said wheels and consequently those of the tires and in particular the rigidity of the lower zones require said wheels to be made in several parts to allow mounting of the tire on a rim. The operations involved in mounting and demounting said tires in the event of replacement or maintenance are long and tedious. The number of clamping parts which have to be handled during these operations may be greater than 200, and very high levels of clamping torque are associated therewith. The time taken for these operations is consequently long and therefore detrimental to the productivity sought during exploitation of said mines.

Since current demands tend towards a constant increase in the loading capacity of these vehicles, the various parameters listed above have resulted in widening of the tires so as to increase the volume of air therein. At around 4 meters, tire diameter is now such that it is virtually impossible to increase it further, in particular for reasons of transportation of said tires. In fact, the dimensions of said tires will be limited by transportation thereof, in particular by road widths and bridge headroom. It is likewise virtually impossible to decrease the rim diameter, which in particular allows positioning of the driving torque transmission system and of the braking systems.

During their studies, the inventors have succeeded in demonstrating that these "widened" tires do effectively allow an increase in transported load but exhibit various drawbacks. Tests have in fact shown that the wear resistance of these tires is reduced with respect to that of current tires. This results in premature wear of the tires and thus a drop in the efficiency of the vehicles and a reduction in productivity.

Furthermore, patent application WO 00/71365 describes a method making it possible to simplify tire mounting, the latter being mounted directly on the hub, which serves as the rim. Independent rings then act as rim seats and are held in place by locking rings, which are connected firmly to the hub as a result in particular of being complementary in profile.

SUMMARY OF THE INVENTION

The inventors thus set themselves the task of responding to a new demand from users, who wish to see a further increase in the loading capacity of load-carrying vehicles, in particular those used in mines, the properties of the tires in terms of wear remaining unimpaired with respect to those of current tires.

This aim is achieved according to the invention by a heavy vehicle, such as a transport vehicle or a "civil engineering" vehicle, of a mass greater than 500 metric tons, fitted with tires of a diameter greater than three meters fifty, and comprising a front axle provided with at least two tires and a rear axle comprising at least two tires and by which is transmitted at least part of the motive power, at least one of the axles comprising at least four tires associated in pairs symmetrically on either side of the axle and two associated tires having different axial widths.

According to a preferred embodiment of the invention, the axially outer tires are narrower.

Preferably also, the axially inner tires transmit at least part of the motive power.

Such a vehicle embodiment makes it possible to increase the loading capacity of this type of vehicle while retaining satisfactory wear properties which are not downgraded with regard to the current situation. The inventors have demonstrated in particular that widening of the tires to achieve an increase in loading capacity, in particular when they are arranged in pairs either side of an axle, results in an increase in wear, in particular due to the presence of curved trajectories which the vehicles follow. According to the invention, narrower tires mounted axially to the outside make it possible, in particular in the case of preferred embodiments in which they do not transmit motive power, to reduce the longitudinal stresses arising in particular when the vehicle follows the course of a bend. In fact, when a vehicle comprising paired or twin tires follows the course of a bend, the tires which are axially furthest to the outside cover a greater distance if positioned on the outside of the bend and a smaller distance if positioned on the inside of the bend.

The inventors have additionally succeeded in demonstrating that, in the case of an axle by which is transmitted at least part of the motive power and which comprises, in accordance with the invention, at least four tires associated in pairs symmetrically on either side of the axle, two associated tires having different axial widths, control of the forces transmitted to each of the tires, if they are all driving tires, is very tricky to achieve. In fact, in such a case transmission of the motive power has to vary according to the axial width of the tires such that the traveling speeds thereof are identical; different axial tire widths are associated with different crown architectures and therefore different rigidities in the thickness of the tread, resulting in different traveling speeds for identical tire circumferences and the drive transmitted to said identical tires.

To avoid such differentials relating to traveling speeds and resulting in "self-wear" of the tires and to simplify implementation of transmission of at least part of the motive power to said axle, a variant of the invention recommends that only the axially inner tires transmit at least part of the motive power.

According to a preferred embodiment of the invention, the rear axle comprises four tires and the two axially outer tires do not transmit the motive power and have as their only essential function that of bearing part of the load.

According to other variant embodiments of the invention, when all the tires on the rear axle transmit at least part of the motive power, the rear axle is advantageously equipped with one or more devices allowing different speeds of rotation to be imparted to the different tires, said speeds being adapted in particular to limit the wear of the various tires.

According to one advantageous embodiment of the invention, at least two tires of the front axle may advantageously transmit part of the motive power.

In a variant embodiment, the invention also provides for the front axle to comprise four tires associated in pairs symmetrically on either side of the axle, two associated tires having different axial widths.

According to this variant embodiment, preferably at least two tires of said front axle transmit part of the motive power, as mentioned above. Preferably, the two axially inner tires are preferably the tires transmitting the motive power. As in the case of the rear axle, the invention also provides, according to another type of embodiment, that, when all the tires of the front axle transmit at least part of the motive power, the front axle is equipped with one or more devices allowing different speeds of rotation to be imparted to the different tires, said speeds being adapted in particular so as to limit the wear suffered by the various tires in particular when traveling round bends.

Another variant embodiment of the invention provides for at least two tires, preferably the tires of the rear axle axially to the outside, not to transmit the motive power solely when the vehicle is following a trajectory which is not rectilinear, or preferably when it is following a bend whose radius of curvature is less than a predetermined value. Such an embodiment may be achieved by a decoupling device between said tires and the members transmitting the motive power. Such a device may be controlled by the vehicle's steering members according to any means known to the person skilled in the art.

In the same manner, the invention advantageously provides for the variant in which at least two tires of the front axle transmit part of the motive power to take effect only when the vehicle is following a trajectory which is not rectilinear, or preferably when it is following a bend whose radius of curvature is less than a predetermined value.

The invention also provides for a vehicle such as described above, each of whose tires is associated with an electric motor, for example incorporated in the wheel associated with the tire or in the axle hub in the vicinity of a tire in the case of an embodiment according to the method described in document WO 00/71365 examined again below.

According to these various possible embodiments, the use of electric motors associated with a tire makes it possible to distribute the motive power variably as a function of the tires and of the trajectory followed.

In the same manner, the invention also provides for some only of the tires transmitting the motive power to be controlled by electric motors; these tires may for example be the tires of the front axle, those of the rear axle retaining conventional motorization and transmission.

When the motive power is due only to the electric motors, the invention also provides for certain ones only of the tires to be associated with such electric motors and for the other tires to have only load-bearing as their essential function.

The invention also advantageously proposes to combine the vehicle as defined above with wheel-less mounting on the axles, the tires being set in place on an axle provided to this end through the intermediary of first mounting rings forming the tire bead seats and second locking rings ensuring positioning of said first rings and therefore of the tires. Mounting of this type has already been described in above-cited patent application WO 00/71365. According to this embodiment, the invention requires that recesses be provided on the hubs to accommodate the locking rings, positioning of two of these rings being necessary per tire. Such a mode of tire mounting makes it possible to improve still further the efficiency of the vehicle according to the invention, which, in addition to slower wear of the tires, allows operations to be performed more quickly in the event of tire change.

Whatever the embodiment of the invention, it is always advantageously provided for all the tires to remain individually associated with a braking device, so as to be able to slow down or stop this type of vehicle under the best conditions.

BRIEF DESCRIPTION OF THE DRAWINGS

Other advantageous details and features of the invention will become clear below from the description of examples of embodiment of the invention made with reference to FIGS. 1 and 2, in which.

To simplify understanding thereof, the FIGS. are not to scale. The Figures show only half of the vehicles, which extend symmetrically relative to the axis XX', which represents the longitudinal median plane of the vehicle.

DETAILED DESCRIPTION OF THE PREFERRED EMBODIMENTS

Figure 1:
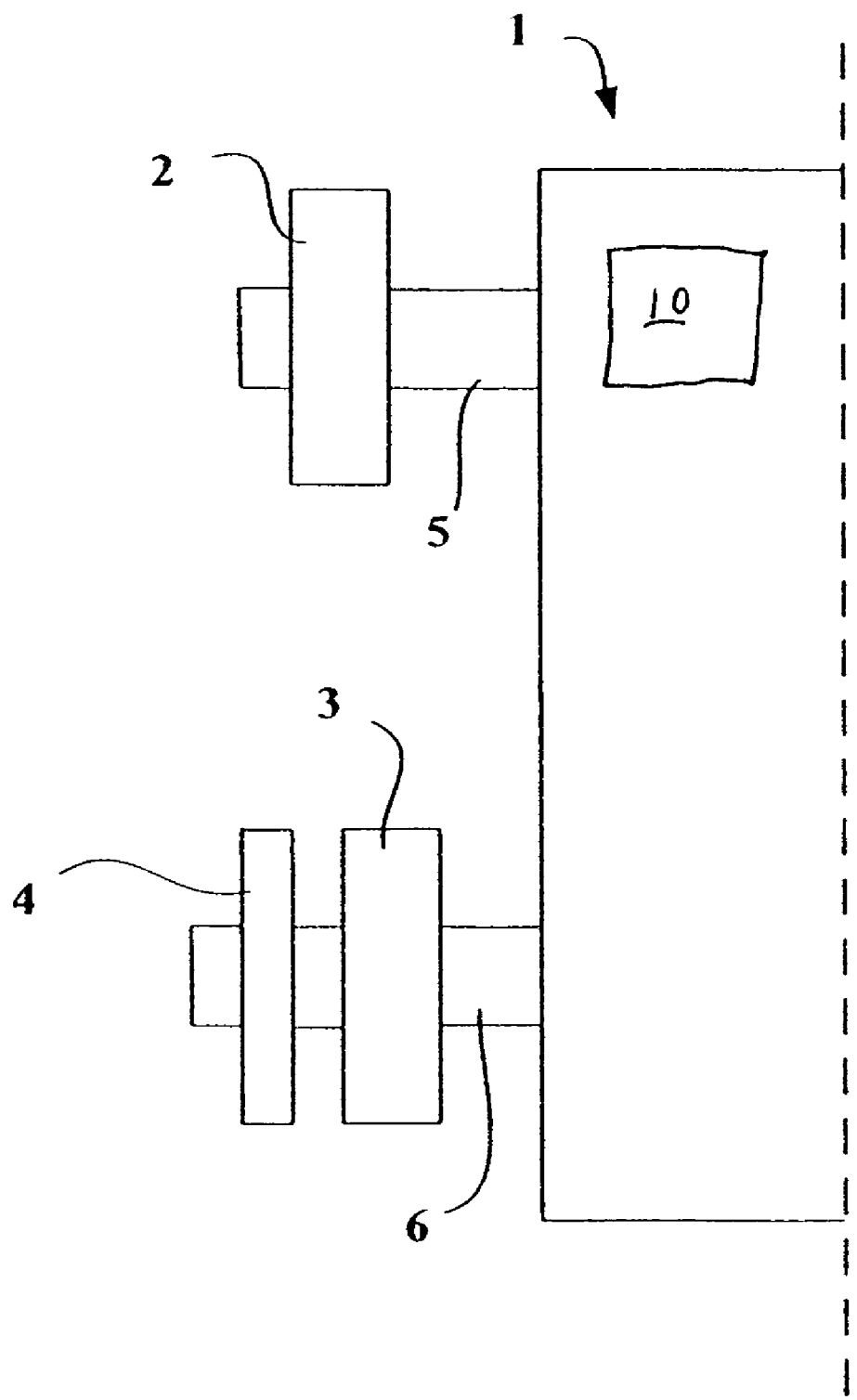
FIG. 1 shows a diagram, viewed from above, of a vehicle according to the invention.

FIG. 1 is a diagrammatic representation of a half-vehicle 1 embodied in accordance with the invention and comprising an electric motor 10 and six tires distributed over the two axles 5, 6, two of said tires being steering tires on the front axle 5. Since FIG. 1 shows only half of the vehicle, only three tires 2, 3, 4 are shown.

The vehicle 1 shown diagrammatically in this FIG. 1 is a heavy vehicle having a total loaded weight of the order of 800 metric tons.

The tires 2 with which the front axle is fitted are large tires whose aspect ratio H/S is equal to 0.50, H being the height of the tire on the rim and S the maximum axial width of the tire when the latter is mounted on its service rim and inflated to its recommended pressure. The tires are of dimension 100/50R69.

The axially inner tires 3 fitted on the rear axle of the vehicle are identical tires to the tires 2 fitted on the front axle of the vehicle and are therefore of dimension 100/50R69.

The axially outer tires 4 with which the rear axle of the vehicle is fitted are large tires whose aspect ratio H/S is 1, H being the height of the tire on the rim and S the maximum axial width of the tire when the latter is mounted on its service rim and inflated to its recommended pressure. The tires are of dimension 44R69.

These various tires comprise a radial carcass reinforcement composed of inextensible metal cables of steel, oriented radially and anchored in each tire bead.

The tires are mounted using the method described in patent application WO 00/71365. According to this method, each axle of the vehicle is designed to receive the tires through the intermediary of rings having a surface forming the tire bead receiving seat. The surface of these rings is advantageously frustoconical in shape. The receiving rings are themselves locked on the hub of the axle through the intermediary of locking rings, one part of whose surface is complementary in shape to that of recesses provided on said hub in which said locking rings are inserted.

The only essential function of the tire 4 is load bearing—it does not participate in the transmission of motive power. Such an embodiment consists in fixing the tire on a system of the free wheeling type, which allows free rotation of said tire 4. The invention should not be understood as being limited to this type of embodiment: according to other embodiments, the tire 4 may transmit part of the motive power.

The vehicle thus embodied allows a loading capacity greater than that of current vehicles, of the order of 800 metric tons. A conventional vehicle comprising identical tires arranged in pairs on the rear axle results for a same transportable load in tire dimensions which are as follows: 69/70R69.

Since this type of vehicle does not exist, it was impossible to carry out tests; however calculations and simulations provide simple ways in which the person skilled in the art may acquire information about the loads transportable by said vehicles, the dimensions thereof as well as the stresses imposed on the tires and consequently an estimate of the wear and fatigue which they withstand.

Simulations were thus performed to determine the service lives of the tires fitted on a vehicle according to the invention and of the tires mounted on the rear axle of a conventional vehicle. The results obtained according to the invention are better.

The invention may provide for the tire 2 mounted on the front axle 5 also to participate in transmission of the motive power. The fact that the tire 2 transmits part of the motive power may improve handling of the vehicle on curved trajectories. In fact, motive power transmitted partially by the tires of the front axle 5 may facilitate following of the trajectory when these same tires are turned, in particular when the vehicle is loaded. It would appear, in fact, that under certain loading and travel conditions, handling of such a vehicle over a curved trajectory is very difficult or indeed impossible, since the vehicle does not respond to the turning imposed by the tires of the front axle. These conditions may furthermore result in splitting and destruction of the tires of the front axle.

Figure 2:
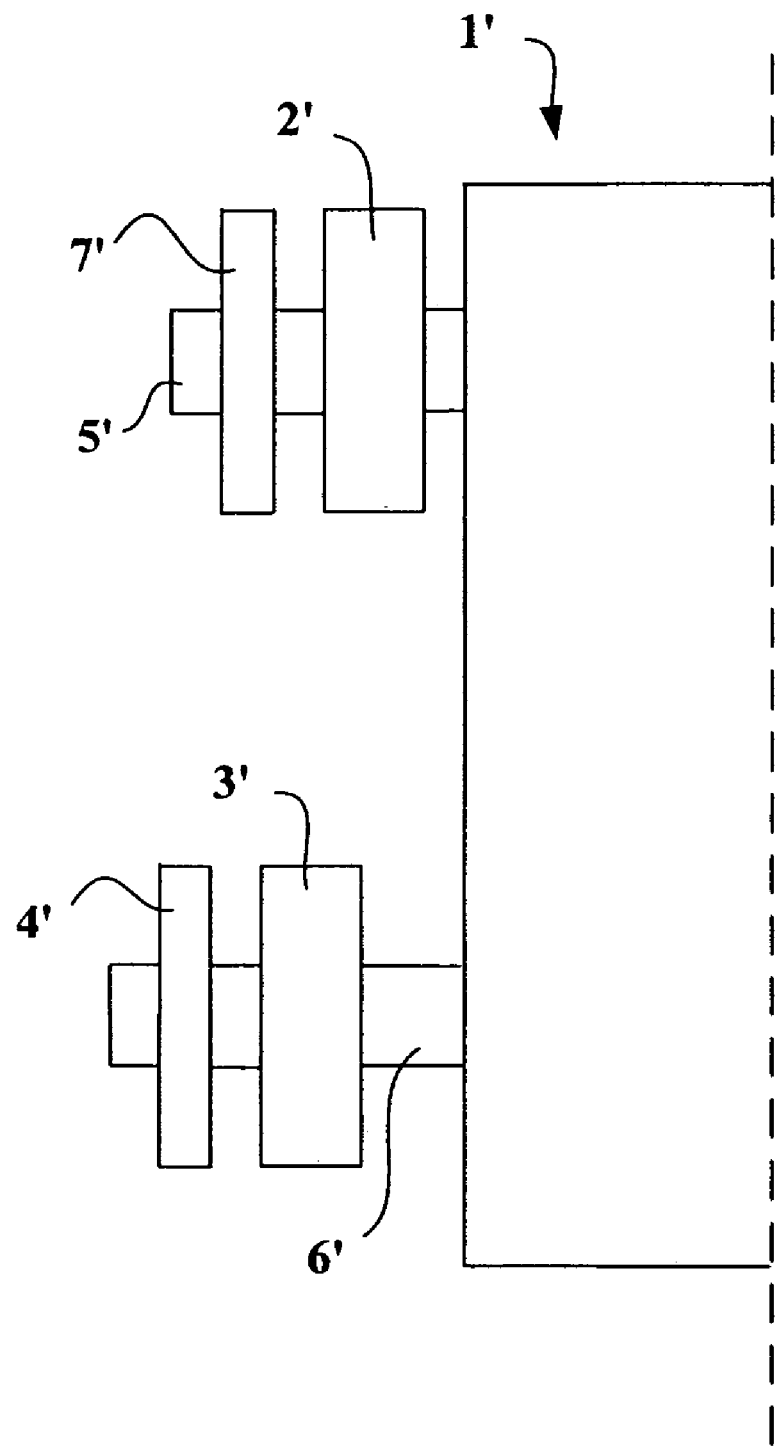
FIG. 2 shows a diagram, viewed from above, of a vehicle according to a second embodiment of the invention.

FIG. 2 illustrates another embodiment of a vehicle 1' according to the invention, which differs from the previous embodiment by the presence of a supplementary tire 7' mounted on the front axle 5' and twinned with the tire 2'. In the same manner as for the rear axle, the tire 7' advantageously has an axial width which is less than that of the tire 2' with which it is twinned. The addition of this tire makes it possible to distribute the load over more tires. Such an embodiment makes it possible, for example, to increase still further the loading capacity or alternatively to permit a reduction in the dimension of the tires, for a given load. The reduction in the size of the tires in particular makes it possible to design a vehicle whose width remains constant for an increasing loading capacity. Such a characteristic may be advantageous where the vehicle has to be used in mines with tracks of set widths which it is impossible to widen. Such a configuration according to the invention may lead in particular to a loading capacity greater than 1000 metric tons.

In such an embodiment of a vehicle 1', the tire 7' may have the sole function of bearing part of the load. According to other variant embodiments, the tire 7' may participate in transmission of the motive power either permanently or temporarily, as mentioned above, or alternatively variably, for example by using electric motors.

What is claimed is:

1. A heavy vehicle of a mass greater than 500 metric tons configured to carry heavy loads and operable to generate a motive power, the vehicle comprising:
   tires of radial structure having a diameter greater than 3.5 meters;
   a front axle coupled to at least two tires; and
   at least one rear axle coupled to at least two tires and by which is transmitted at least part of the motive power,
   wherein at least one of the axles comprises at least four tires associated in pairs symmetrically on either side of the axle, the each associated pair of tires comprises an axially inner tire and an axially outer tire,
   wherein the two tires of each associated pair of tires have different axial widths, and
   wherein only the axially inner tire of the two tires of each associated pair of tires transmits at least part of the motive power.

2. A vehicle according to claim 1, wherein the axially outer tires are narrower than the axially inner tires.

3. A vehicle according to claim 1, wherein the at least one of the axles comprises the rear axle.

4. A vehicle according to claim 1, wherein the front axle comprises at least two tires transmitting at least part of the motive power.

5. A vehicle according to claim 1, wherein the at least one of the axles comprises the front axle.

6. A vehicle according to claim 1, wherein at least some of the tires transmitting the motive power are controlled by an electric motor.

* * * * *